United States Patent
Kernchen et al.

(10) Patent No.: US 7,330,503 B2
(45) Date of Patent: Feb. 12, 2008

(54) SIGNAL GENERATOR WITH FREQUENCY OFFSET UNIT IN THE BASE BAND

(75) Inventors: Wolfgang Kernchen, Sauerlach (DE); Andreas Hecht, Eichenau (DE); Wolfgang Kufer, Muehldorf (DE)

(73) Assignee: Rohde & Schwarz GmbH & Co. KG, Munich (DE)

(*) Notice: Subject to any disclaimer, the term of this patent is extended or adjusted under 35 U.S.C. 154(b) by 563 days.

(21) Appl. No.: 10/477,937

(22) PCT Filed: Apr. 16, 2002

(86) PCT No.: PCT/EP02/04213

§ 371 (c)(1),
(2), (4) Date: Jun. 7, 2004

(87) PCT Pub. No.: WO02/095993

PCT Pub. Date: Nov. 28, 2002

(65) Prior Publication Data

US 2004/0218691 A1 Nov. 4, 2004

(30) Foreign Application Priority Data

May 18, 2001 (DE) .............................. 101 24 372

(51) Int. Cl.
*H04B 17/00* (2006.01)

(52) U.S. Cl. ...................... 375/224; 375/295; 375/307; 455/500; 455/102

(58) Field of Classification Search ................ 375/295, 375/224, 307; 455/500, 102
See application file for complete search history.

(56) References Cited

U.S. PATENT DOCUMENTS

| | | | |
|---|---|---|---|
| 4,485,357 A | * | 11/1984 | Voorman ..................... 332/145 |
| 5,465,050 A | | 11/1995 | Marinelli et al. |
| 5,539,772 A | | 7/1996 | Fasulo et al. |
| 6,100,771 A | | 8/2000 | Komiya |

FOREIGN PATENT DOCUMENTS

| | | |
|---|---|---|
| DE | 196 80 765 C1 | 2/1997 |
| EP | 0 437 362 A2 | 7/1991 |
| EP | 0 917 297 A2 | 5/1999 |
| EP | 0 977 351 A1 | 2/2000 |

OTHER PUBLICATIONS

PCT, IPER, completed Jul. 14, 2003.

* cited by examiner

*Primary Examiner*—Chieh M. Fan
*Assistant Examiner*—Aris Fotakis
(74) *Attorney, Agent, or Firm*—Ditthavong Mori & Steiner, P.C.

(57) ABSTRACT

A signal generator comprises at least one first base band unit and a second base band unit, generating a digital base band signal. At least one first frequency offset unit, connected to the first base band unit, which adds the output signal form the second base band unit and the output signal from the frequency offset unit and an I/Q modulator, in series with the addition unit are provided.

6 Claims, 1 Drawing Sheet

SIGNAL GENERATOR WITH FREQUENCY OFFSET UNIT IN THE BASE BAND

FIELD OF THE INVENTION

The invention relates to a signal generator, in which a digital base band signal is first generated by means of a base band unit, and subsequently—optionally after the insertion of units capable of simulating a transmission channel e.g. with fading, distortion and noise—supplied to a I/Q modulator.

BACKGROUND OF THE INVENTION

In mobile telephone technology, a broad-band amplifier, which can be used to amplify several mobile telephone signals at the same time, is increasingly used in order to economise on costs. For instance, two or more W-CDMA (Wideband—Code Division Multiple Access) signals positioned on different frequency bands, or a GSM signal and a W-CDMA signal may be required at the same time. In order to test a power amplifier in a base station, for example, this power amplifier must be supplied with a measurement signal, which simulates the operational situation as close to reality as possible, i.e. with a combined signal derived from the two above-named individual signals. For this purpose, the individual signals have, hitherto, been generated in separate signal generators as separate high-frequency signals, which are then combined at the output of the signal generators, i.e. at the high-frequency side. This raises the problem of synchronising the two separate signal generators. Moreover, it is disadvantageous that several signal generators are needed, because it is difficult to operate several separate devices, and the devices require complex wiring at the output side.

Regarding background art, reference is made, by way of example, to U.S. Pat. No. 5,465,050, wherein the output signal from a signal generator is combined on the high-frequency side, via a resistor network, with the output signal from a noise generator.

SUMMARY OF THE INVENTION

The invention addresses therefore a need for creating a signal generator, capable of generating digitally-modulated signals modulated uniformly or differently and positioned in different frequency bands in a simple manner.

According to an embodiment of the invention, at least two base band units are provided, wherein the output signals from the base band units are already offset relative to one another in the base band, and wherein the base band signals offset with regard to their frequency position are added. For example, two W-CDMA signals can be generated, which are offset in their frequency position by a few MHz relative to one another.

The advantage of this procedure is that the combined signal can be generated with a single signal generator, and several signal generators need not be interconnected at the high frequency side. This ensures ease of handling.

The base band units can be controlled in a synchronous manner by a common control unit, i.e. by a common microprocessor, a common digital signal processor or a common synthesiser. There is therefore no synchronisation problem as encountered when using two separate signal generators. Optionally, approximately the same setting may be adopted for both base band units, and the user need only adjust the appropriate parameter once on the device for both base band units.

A base band generator, to which external signals can be supplied (analogue or digital, e.g. I/Q-data or an intermediate frequency signal) can be provided. The digital base band signal, which is generated from this externally supplied signal, can also be offset in frequency.

Furthermore, units which simulate certain channel properties, e.g. fading units, noise units or distortion units can be inserted between the base band units and the I/Q-modulators. In this context, as an alternative, the base band signals need not be added to the combined signal until after the fading units and/or the noise units.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

An exemplary embodiment of the invention is described in greater detail below with reference to the drawing. The drawing is as follows.

DETAILED DESCRIPTION OF THE PREFERRED EMBODIMENT

Figure 1:
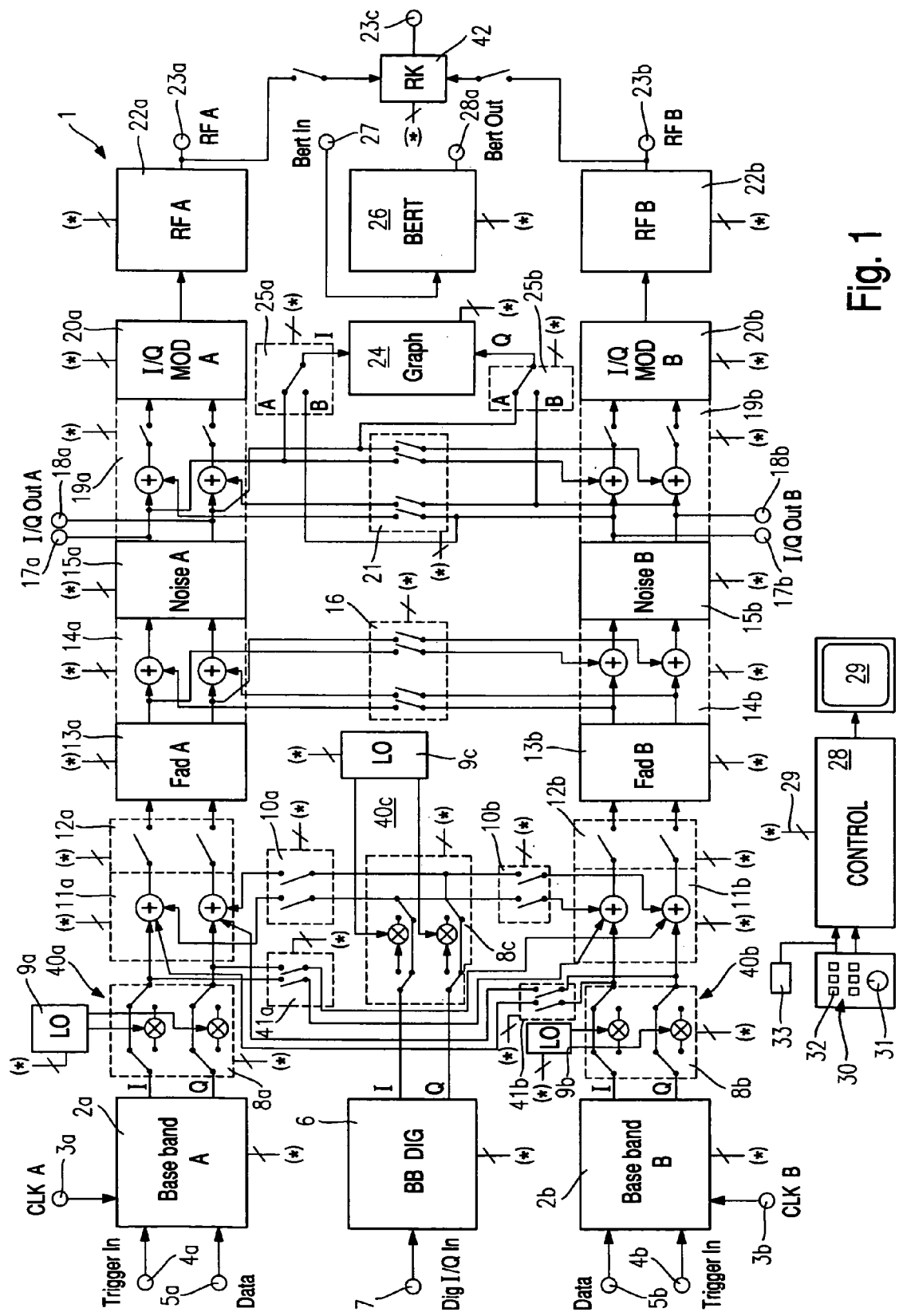
FIG. 1 shows a block circuit diagrams of an exemplary embodiment of a signal generator according to the invention.

The signal generator 1 provides a first base band unit 2a and a second base and unit 2b. The base band units 2a and 2b generate at their I and Q outputs base band signals according to predetermined standards, which can be selected by the user, for example, according to the GSM standard, the GSM-EDGE standard or the Wideband-CDMA standard. The base band signals 2a, 2b can be supplied with clock signals at bushes 3a and/or 3b; trigger signals at bushes 4a and/or 4b; and modulation data at bushes 5a and/or 5b. Alongside these, in the exemplary embodiment illustrated, a digital base band generator 6 is provided, which generates the I- and Q-components of a further base band signal from digital I/Q-values supplied to a bush 7. The output signal from the digital base band generator 6 can be frequency-offset via a multiplication unit 8c, to which the adjustable frequency of an adjustable local oscillator 9c is supplied. The multiplication unit 8c and the local oscillator 9c therefore form a frequency-offset unit 40c.

The optionally frequency-offset base band signal from the digital base band generator unit 6 is supplied via a first switch element 10a and/or a second switch element 10b to a digital addition unit 11a or a digital addition unit 11b.

The output signal from the base band unit 2a is supplied to a multiplication unit 8a consisting in each case of a multiplier for the I-component and for the Q-component. The adjustable frequency of an adjustable local oscillator 9a is supplied to the multiplication unit 8a. Accordingly, the digital output signal from the base band unit 2a can be frequency-offset if required. If no frequency offset is required, the multiplier of the multiplication unit 8a can be bypassed by means of switchable rerouting lines. The output signal from the multiplication unit 8a is supplied to the addition unit 11a.

In a similar manner, the output signal from the base band unit 8*b* is supplied to a multiplication unit 8*b*, consisting in each case of a multiplier for the I-component and the Q-component. The multipliers of the multiplication unit 8*b* are connected to the adjustable local oscillator 9*b*, so that the frequency of the digital output signal from the base band unit 2*b* can be frequency offset if required. If no frequency offset is required, the multipliers of this multiplication unit 8*b* can also be bypassed by means of switchable rerouting lines. The output signal from the multiplication unit 8*b* is supplied to the addition unit 11*b*.

The output from the multiplication unit 40*a* can also be connected via a switch element 41*a* to the addition unit 11*b*, while the output from the multiplication unit 8*b* can be connected via a switch element 41*b* to the addition unit 11*a*.

In this manner, the output signals from the base band unit 2*a*, the base band unit 2*b* and the base band generator 6 can be frequency offset independently from one another and added with a frequency-offset either to the addition unit 11*a* or the addition unit 11*b*.

The output signal from the addition units 11*a* and 11*b* can be supplied via a switch element 12*a* and/or a switch element 12*b* to a fading unit 13*a* and/or 13*b*, which applies fading (variable decrease) and/or distortion to the base band signal. The functions of the fading units 13*a* and 13*b*, such as the number, the time delay and the damping of the signal-delay pathways implemented in the fading unit, can be determined by the user. The fading units 13*a* and 13*b* are each connected via an addition unit 14*a* and/or 14*b* to a noise unit 15*a* and/or 15*b*. The noise units 15*a*, 15*b* apply a noise signal, which can be determined by the user, to the base band signal. For example, the type of noise and the level of the noise signal generated by the noise unit 15*a*, 15*b* can be selected by the user.

The output signals from the fading units 13*a*, 13*b* can also be added and in each case supplied to one of the two noise units 15*a* and/or 15*b* via a switch element 16 connecting the addition units 14*a* and 14*b* instead of connecting the relevant fading unit 13*a* and/or 13*b* separately to the allocated noise unit 15*a* and/or 15*b*. The I/Q output signals at the output of the noise units 15*a* and/or 15*b* can be extracted at bushes 17*a* and 18*a* and/or 17*b* and 18*b*.

The output signals from the noise units 17*a* and 17*b* can be supplied to I/Q-modulators 20*a* and/or 20*b* via addition and switch units 19*a* and 19*b*. In this case also, the output signals from the noise units 15*a* and 15*b* can be added via a switch element 21 and supplied to one of the two I/Q-modulators 20*a* and/or 20*b*. Several user-specific selection options are also available with regard to the function of the I/Q modulator 20*a*, 20*b*. For example, the I/Q-modulator 20*a*, 20*b* can be operated to generate a burst sequence, and the active bursts and/or the level of the active bursts can be selected by the user.

In each case, the I/Q-modulators 20*a* and 20*b* are connected to a high-frequency unit 22*a* and/or 22*b*, and a high-frequency signal can be picked up at a bush 23*a* and/or 23*b*. For example, the output frequency, or several output frequencies initiated according to the sudden-frequency-change process from the high frequency unit 22*a* and 22*b*, can be selected by the user.

Additionally, a signal display 24 is available, which can be connected via switch elements 25*a* and/or 25*b* in the exemplary embodiment to the output of the noise unit 15*a* or the noise unit 15*b*. Alternatively, it is also conceivable for the display device 24 to be connected directly to the outputs from the base band units 2*a* and 2*b*. For instance, the signal display 24 allows the configuration diagram to be displayed, so that the user can check the method of operation of the connected signal pathway.

A Bit Error Rate Tester (BERT) 26 is also provided, and a signal from the device under test (DUT) can be supplied to the input bush 27 of the BERT 26, so that the bit error rate of the signal can be deducted at the output bush 28.

Other functional units may also be present and variant combinations of the functional units may be possible. These have not been explained here for the sake of simplicity.

Using a combination unit 42, such as a directional coupler or a resistor network, the outputs 23*a* and 23*b* from the high-frequency units 22*a* and 22*b* may optionally be capable of further combination allowing the two signal pathways to be added on the high frequency side, if required, to form a combined signal. Accordingly, the two frequency-offset base band signals may optionally each be modulated on two separate high-frequency pathways, so that only the two analogue high-frequency signals are added. If the addition is carried out in the base band, the attainable signal dynamics are limited by the analogue-digital converter. This disadvantage is not encountered if the addition is implemented in the analogue range. However, a greater degree of complexity is required in this case. In this context, the two high frequency pathways operate with the same carrier frequency. By contrast with the solution of operating both high-frequency pathways with different carrier frequencies and dispensing with the frequency offset in the base band, this provides the advantage that only one frequency generator unit, for example, only one synthesiser, is needed to generate the carrier frequency. This clearly leads to a reduction in complexity.

All of the functional units described above: 2*a*, 2*b*, 6, 8*a*, 8*b*, 8*c*, 9*a*, 9*b*, 9*c*, 10*a*, 10*b*, 11*a*, 11*b*, 12*a*, 12*b*, 13*a*, 13*b*, 14*a*, 14*b*, 15*a*, 15*b*, 16, 19*a*, 19*b*, 20*a*, 20*b*, 21, 22*a*, 22*b*, 24, 26, 40*a*, 40*b*, 41*a*, 41*b*, 42 are connected to a control unit 28, for example, a CPU, via a control bus 29. Connections to the functional units are indicated by the symbol (*). The control unit 28 controls the configuration and function of the individual functional units required by the user. The current configuration of the functional units can be displayed on a display device 29, which can be disposed, together with the operating elements 30, at the front of the signal generator 1. For this purpose, a graphic functional block is allocated to each functional unit, and the connection of the functional units is displayed on the display device 29 through corresponding connecting elements, which connect the functional blocks to one another. The connections between functional blocks and the function of the functional blocks are selected either by means of a rotary knob 31, appropriate operating buttons 32 and/or via a mobile positioning element 33 (mouse).

While the present invention has been described in connection with a number of embodiments and implementations, the present invention is not so limited but covers various obvious modifications and equivalent arrangements, which fall within the purview of the appended claims.

What is claimed is:

1. A signal generator comprising:
   at least one first base band unit and a second base band unit, configured for a digital base band signal,
   at least one first frequency offset unit, coupled to the first base band unit and configured for offsetting a frequency of an output signal from the first base band unit by a frequency offset,
   at least a second frequency offset unit, coupled to the second base band unit and configured for offsetting a frequency of an output signal from the second base band unit by a frequency offset, at least one first addition unit, configured for adding an output signal from the second base band unit and an output signal from the first frequency offset unit, a first I/Q-modulator coupled in series to the first addition unit, a second addition unit configured for adding the output signal from the first base band unit and the output signal from the second frequency offset unit, and a second I/Q-modulator coupled in series to the second addition unit.

2. A signal generator according to claim 1, wherein the base band units are controlled in a synchronous manner by a common control unit.

3. A signal generator according to claim 1, further comprising separate high frequency units connected in series to each of the I/Q-modulators, wherein the output signals from the high frequency units are combined in a combination unit.

4. A signal generator according to claim 1, further comprising:
   a fading unit configured for applying fading and/or distortion to the base band signal, and connected in series to each base band unit, and
   at least one further addition unit coupled in series to the fading units by means of which output signals from the fading units are added.

5. A signal generator according to claim 1, further comprising:
   a noise unit configured for applying noise to the base band signal, and connected in series to each base band unit, and
   at least one further addition unit coupled in series to the noise units by means of which output signals from the noise units are added.

6. A signal generator comprising:

at least one first base band unit and a second base band unit, configured for a digital base band signal, at least one first frequency offset unit, coupled to the first base band unit and configured for offsetting a frequency of an output signal from the first base band unit by a frequency offset, at least a second frequency offset unit, coupled to the second base band unit and configured for offsetting a frequency of an output signal from the second base band unit by a frequency offset, at least one first addition unit, configured for adding an output signal from the second base band unit and an output signal from the first frequency offset unit, an I/Q-modulator coupled in series to the first addition unit, a base band generator, to which an external signal is supplied, configured for generating a digital base band signal from the external signal, and a further frequency offset unit, coupled to the base band generator and configured for offsetting the frequency of the output signal from the base band generator by a frequency offset, wherein the output signal from the further frequency offset unit is supplied to the first addition unit.

* * * * *